United States Patent
Caretti et al.

(10) Patent No.: US 10,966,117 B2
(45) Date of Patent: Mar. 30, 2021

(54) FRONTHAUL CONGESTION CONTROL IN A MOBILE COMMUNICATION NETWORK

(71) Applicant: TELECOM ITALIA S.p.A., Milan (IT)

(72) Inventors: Marco Caretti, Turin (IT); Gian Michele Dell'aera, Turin (IT); Francesco Mauro, Turin (IT); Damiano Rapone, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/619,525

(22) PCT Filed: Jun. 14, 2018

(86) PCT No.: PCT/EP2018/065875
§ 371 (c)(1),
(2) Date: Dec. 5, 2019

(87) PCT Pub. No.: WO2019/001984
PCT Pub. Date: Jan. 3, 2019

(65) Prior Publication Data
US 2020/0137618 A1     Apr. 30, 2020

(30) Foreign Application Priority Data
Jun. 30, 2017   (IT) .................. 102017000073442

(51) Int. Cl.
*H04W 28/02*   (2009.01)
*H04W 16/26*   (2009.01)
*H04W 88/08*   (2009.01)

(52) U.S. Cl.
CPC ....... *H04W 28/0278* (2013.01); *H04W 16/26* (2013.01); *H04W 28/0289* (2013.01); *H04W 88/085* (2013.01)

(58) Field of Classification Search
None
See application file for complete search history.

(56) References Cited

U.S. PATENT DOCUMENTS

2014/0355540 A1* 12/2014 Accongiagioco ............................ H04W 72/1231 370/329
2015/0098415 A1* 4/2015 Chen ..................... H04W 76/00 370/329

(Continued)

FOREIGN PATENT DOCUMENTS

WO    WO 2016/145371 A2    9/2016

OTHER PUBLICATIONS

International Search Report and Written Opinion dated Aug. 8, 2018 in PCT/EP2018/065875 filed on Jun. 14, 2018.

*Primary Examiner* — Anh Vu H Ly
(74) *Attorney, Agent, or Firm* — Oblon, McClelland, Maier & Neustadt, L.L.P.

(57) ABSTRACT

A mobile network includes a base station having a central unit and a remote unit. The remote unit includes data buffers, each one associated with a respective user equipment for temporarily storing data to be transmitted thereto. For each selected user equipment, a method includes determining a status of the data buffer associated with the selected user equipment, and determining an average data traffic that the selected user equipment is able to receive. According to the status of the remote unit data buffer and to the average data traffic, a data throughput is determined with which the central unit can transmit the data for the selected user equipment to the data buffer associated with the selected user equipment. The method also causes the central unit to transmit the data for the selected user equipment to the data buffer associated thereto according to the determined data throughput.

15 Claims, 2 Drawing Sheets

(56) References Cited

U.S. PATENT DOCUMENTS

Figure 1:
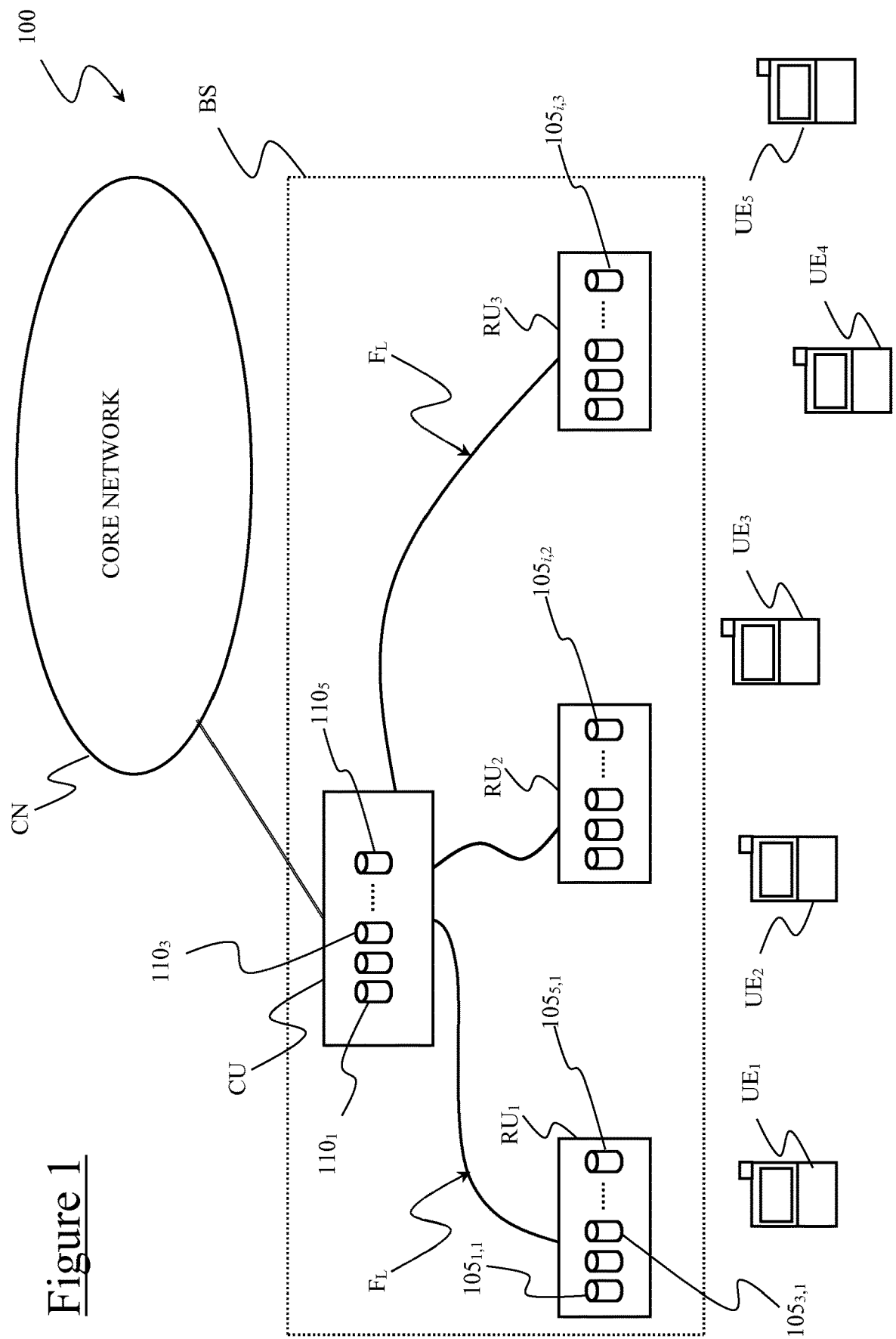

| | | |
|---|---|---|
| 2017/0164236 A1 | 6/2017 | Boldi et al. |
| 2017/0332385 A1* | 11/2017 | Shirali .................. H04W 72/10 |
| 2017/0373890 A1 | 12/2017 | Fertonani et al. |
| 2018/0013581 A1 | 1/2018 | Fertonani et al. |
| 2018/0013597 A1 | 1/2018 | Barbieri et al. |
| 2018/0034669 A1 | 2/2018 | Barbieri et al. |
| 2018/0227919 A1* | 8/2018 | Lee .................. H04W 72/0453 |
| 2020/0359356 A1* | 11/2020 | Sirotkin ................ H04L 1/1896 |

* cited by examiner

FRONTHAUL CONGESTION CONTROL IN A MOBILE COMMUNICATION NETWORK

BACKGROUND OF THE INVENTION

Field of the Invention

The present invention generally relates to mobile communication networks—hereinafter, mobile networks. More specifically, the present invention relates to mobile networks based on a "Centralized Radio Access Network" (CRAN) architecture and to a method for controlling fronthaul congestion in such mobile networks.

Overview of the Related Art

Information Technology industries are currently developing the fifth generation (5G) mobile network aimed at providing pervasive always-on, always-connected broadband services. With respect to the previous generation of mobile network, i.e. Long Term Evolution (LTE)/LTE-Advanced (LTE-A) mobile networks, 5G mobile network is expected to boost capacity as well as spectral efficiency, energy efficiency and data rates.

To achieve these goals, "Centralized Radio Access Network" (C-RAN) architecture has been proposed. According to C-RAN architecture, the traditional base station is decoupled in two parts: a distributed installed remote unit, also known as "Remote Radio Head" (RRH), and a central unit, also known as "Baseband Unit" (BBU); the physical link that connects the central unit to the remote unit is termed as fronthaul link. Typically, a certain number of remote units are connected to a single central unit, and different central units can be clustered as a central unit pool in a centralized cloud server.

A remote unit provides high coverage and capacity in the geographically-limited area where it is deployed, while a central unit allows for large-scale processing and management of signals transmitted to/received from distinct remote units, as well as flexible spectrum management, advanced network coordination and efficient interference mitigation. Additional advantages of C-RAN architecture come from low energy consumption thanks to the reduced footprint and power consumption in the remote unit.

Despite these attractive advantages, C-RAN architecture is particularly challenging in terms of design requirements, especially for the fronthaul links for which high bandwidth and low latency are needed.

In order to overcome such drawbacks in the C-RAN architecture, functional split has been proposed. According to functional split, some radio functionalities are left in the remote unit while other radio functionalities are centralized in the central unit. Therefore, according to functional split, the remote unit has both radio functionalities (as in the traditional C-RAN architecture) and base station protocol layers.

On the one hand, functional split allows reducing the bandwidth and latency requirements of the fronthaul link and, on the other hand, functional split allows implementing in the remote unit those functionalities that are more challenging in terms of real time constraints.

US2014226481 discloses a system, a method, and a computer program product for coordinating communication of data packets between a user device and a core network. The system includes a first device communicatively coupled to the core network, a second device communicatively coupled to the first device. The second device receives signals from the user device. The first device and the second device share at least one functionality associated with layer 2 of a long term evolution radio access network.

US2014286258 discloses a system, a method, a device, and a computer program product for transmission of data packets between a user device and a server. A communication link between the user device and the server is established in accordance with a transmission control protocol for transmission of a data packet between the user device and the server. The data packet is transmitted utilizing the transmission control protocol.

SUMMARY OF INVENTION

The Applicant has found that the above-cited solutions are not fully satisfactory for modern technological requirements.

Specifically, the Applicant has found that, in conventional split functionalities, the effective data throughput of the fronthaul link is practically limited by the remote unit radio interface data throughput (i.e., the data throughput over the radio link between the remote unit and user equipment served by it), which determines congestion of the fronthaul link and subsequent loss of user equipment data packet.

The Applicant has also found that neither US2014226481 nor US2014286258 are satisfactory. In fact, the solution disclosed in US2014226481 is limited to the specific case in which "Carrier Aggregation" is available in the mobile network, whereas the solution disclosed in US2014286258 refers to an architecture other than a C-RAN architecture (and specifically it refers to a standard architecture including an evolved NodeB, a server, and a communication link therebetween).

In view of the above, the Applicant has tackled the congestion issues affecting the fronthaul link due to the remote unit radio interface data throughput, and has devised a method and a system for controlling fronthaul link congestion.

One or more aspects of the present invention are set out in the independent claims, with advantageous features of the same invention that are set forth in the dependent claims (whose wording is enclosed herein verbatim by reference).

More particularly, the present invention relates to a method for arranging data transmission in a mobile network. The mobile network comprises a base station having a central unit and a remote unit, wherein the remote unit comprises a plurality of remote unit data buffers each one associated with a respective user equipment for temporarily storing data to be transmitted thereto. For each selected user equipment the method comprises, in presence of data for the selected user equipment at the central unit:

determining a status of the remote unit data buffer associated with the selected user equipment;

determining an average data traffic that the selected user equipment is able to receive;

according to said status of the remote unit data buffer and to said average data traffic, determining a data throughput with which the central unit can transmit said data for the selected user equipment to the remote unit data buffer associated with the selected user equipment, and causing the central unit to transmit said data for the selected user equipment to the remote unit data buffer associated with the selected user equipment according to the determined data throughput.

According to an embodiment of the present invention, the central unit comprises a plurality of central unit data buffers each one associated with a respective user equipment for temporarily storing data to be transmitted to the remote unit data buffer associated with that user equipment. Said determining a status, said determining an average data traffic, said determining a data throughput and said causing the central unit to transmit are preferably carried out if said data for the selected user equipment determine a load condition of the central unit data buffer associated with the selected user equipment below a threshold load condition.

According to an embodiment of the present invention, said determining a status, said determining an average data traffic, said determining a data throughput and said causing the central unit to transmit (or at least one among these steps) are carried out upon reception at the central unit of said data for the selected user equipment.

According to an embodiment of the present invention, said determining an average data traffic that the selected user equipment is able to receive comprises determining, at the remote unit, a spectral efficiency associated with the selected user equipment.

According to an embodiment of the present invention, said determining a spectral efficiency associated with the selected user equipment comprises determining the spectral efficiency associated with the selected user equipment based on a channel quality indicator if the remote unit data buffer associated with the selected user equipment is in a first status, for example if the remote unit data buffer associated with the selected user equipment is empty.

According to an embodiment of the present invention, said determining a spectral efficiency associated with the selected user equipment comprises determining the spectral efficiency associated with the selected user equipment based on at least one transmission parameter related to a current transmission between the selected user equipment and the remote unit if the remote unit data buffer associated with the selected user equipment is in a second status, for example if the remote unit data buffer associated with the selected user equipment is not empty.

According to an embodiment of the present invention, the at least one transmission parameter comprises at least one among:
  modulation and coding scheme;
  rank indicator;
  signal to noise ratio;
  channel quality indicator.

According to an embodiment of the present invention, said determining an average data traffic that the selected user equipment is able to receive comprises determining, at the central unit, the average data traffic according to at least one among:
  modulation and coding scheme;
  rank indicator;
  signal to noise ratio;
  channel quality indicator.

According to an embodiment of the present invention, said determining an average data traffic that the selected user equipment is able to receive is based on at least one information exchanged between the remote unit and the central unit.

According to an embodiment of the present invention, said at least one information exchanged between the remote unit and the central unit is exchanged periodically.

According to an embodiment of the present invention, said at least one information exchanged between the remote unit and the central unit is exchanged aperiodically.

According to an embodiment of the present invention, said at least one information exchanged between the remote unit and the central unit is transmitted by the remote unit to the central unit on central unit request, for example upon reception at the central unit of said data for the selected user equipment, and/or on remote unit initiative, for example when a load condition of the remote unit data buffer associated with the selected user equipment reaches a predetermined load condition.

According to an embodiment of the present invention, radio functionalities are split between the central unit and the remote unit according to a functional split option in which, for downlink transmission, radio resource scheduling is performed at the remote unit side and corresponding scheduling decisions are not communicated to the central unit.

According to an embodiment of the present invention, the media access control layer is implemented at the remote unit side.

Another aspect of the present invention relates to a base station having a central unit and a remote unit. The remote unit comprises a plurality of remote unit data buffers each one associated with a respective user equipment for temporarily storing data to be transmitted thereto. For each selected user equipment the base station is configured to, in presence of data for the selected user equipment at the central unit:
  determine a status of the remote unit data buffer associated with the selected user equipment;
  determine an average data traffic that the selected user equipment is able to receive;
  according to said status of the remote unit data buffer and to said average data traffic, determine a data throughput with which the central unit can transmit said data for the selected user equipment to the remote unit data buffer associated with the selected user equipment.

The central unit is configured to transmit said data for the selected user equipment to the remote unit data buffer associated with the selected user equipment according to the determined data throughput.

A further aspect of the present invention relates to a mobile network comprising said base station (or more thereof).

A still further aspect of the present invention relates to a computer program product for performing the method of above when the computer program product is run on a computer.

BRIEF DESCRIPTION OF THE ANNEXED DRAWINGS

Figure 2:
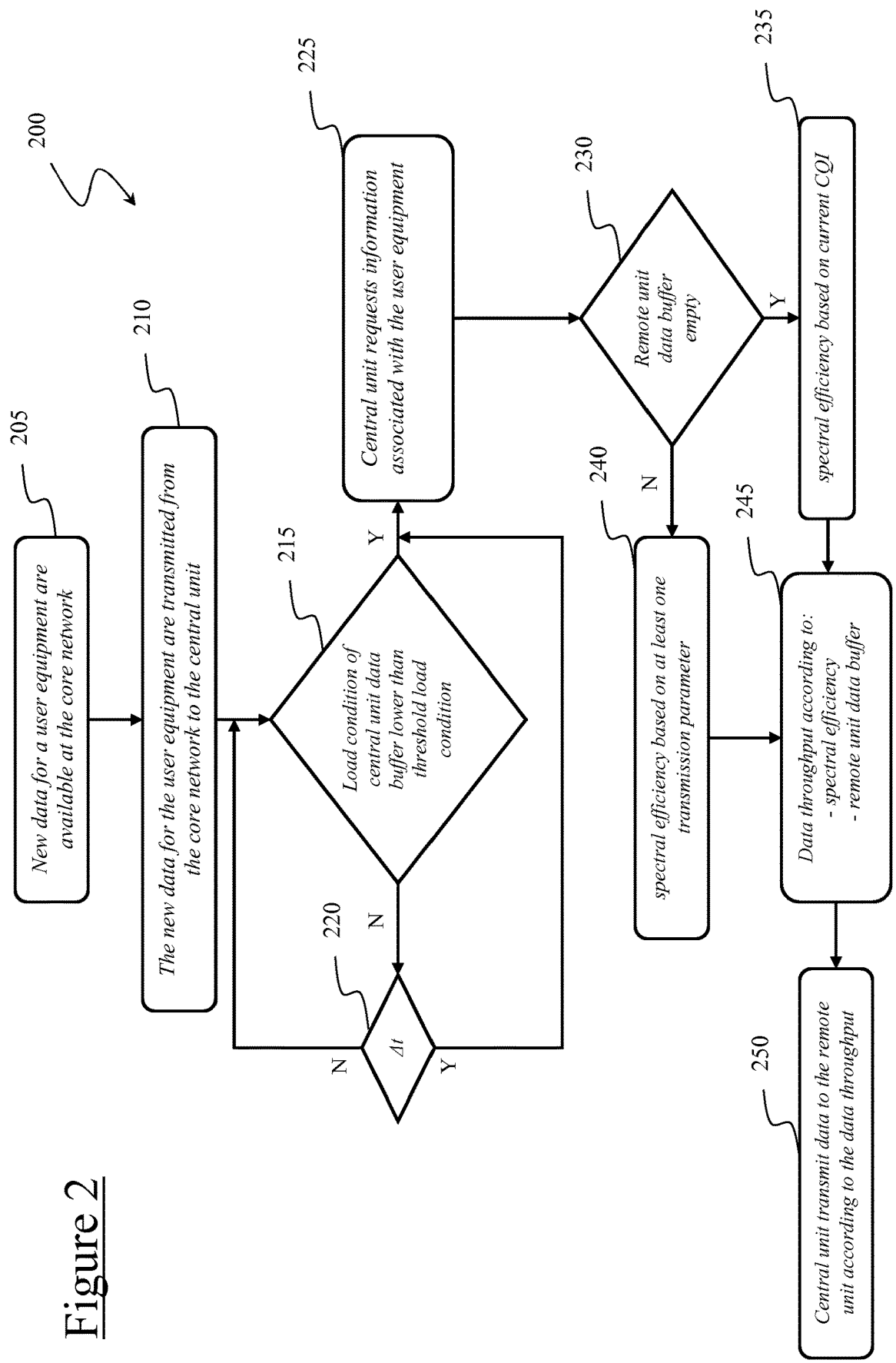

These and other features and advantages of the present invention will be made apparent by the following description of some exemplary and non-limitative embodiments thereof. For its better intelligibility, the following description should be read making reference to the attached drawings, wherein:

FIG. 1 schematically shows a mobile communication network according to an embodiment of the present invention, and FIG. 2 shows a flow chart of a method for computing a data throughput at which data are to be sent to user equipment over a fronthaul link, according to an embodiment of the present invention.

DETAILED DESCRIPTION OF PREFERRED EMBODIMENTS OF THE INVENTION

With reference to the drawings, FIG. 1 schematically shows a mobile communication network (hereinafter, mobile network) 100 according to an embodiment of the present invention.

The mobile network 100 allows data to be transmitted between user equipment $UE_i$ (i=1, 2, . . . , I), such as the user equipment $UE_1$-$UE_5$ (I=5), and one or more base stations (also known as "Baseband Unit"), such as the base station BS.

The mobile network 100 is for example compliant with the 3GPP LTE/LTE-Advanced standard.

According to the preferred, not limiting, illustrated embodiment, the mobile network 100 is based on "Centralized Radio Access Network" (CRAN) architecture, wherein each base station BS (or at least one of the base stations of the mobile network 100) comprises a central unit, such as the central unit CU, and one or more remote units (also known as "Remote Radio Head") $RU_j$ associated therewith (e.g., coupled or connected thereto) j=1, 2, . . . , J, with J=3 in the example at issue. As illustrated, the central unit CU is preferably connected, on one side, to the remote units $RU_j$ by means of a physical link referred to as fronthaul link $F_L$, and, on the other side, to a core network CN (e.g., by means of a proper wired or wireless link usually referred to as backhaul link). Each remote unit $RU_j$ is configured to transmit data from the central unit CU to plural user equipment $UE_i$ (downlink transmission) and for transmitting data from plural user equipment $UE_i$ to the central unit CU (uplink transmission).

According to the preferred considered embodiment, the mobile network 100 is based on "functional split". According to functional split, radio functionalities are split between the remote units $RU_j$ and the central unit CU in order to reduce bandwidth and latency requirements of the fronthaul link $F_L$ and to relegate to the remote units $RU_j$ those radio functionalities that are more challenging in terms of real time constraints.

In the following, functional split options will be assumed in which, for downlink transmission, radio resource scheduling is performed at the remote unit $RU_j$ side and the corresponding scheduling decisions are not communicated to the central unit CU. Particularly, functional split options will be assumed in which at least the MAC layer is implemented at the remote unit $RU_j$ side, which is the worst scenario in terms of congestion over the fronthaul link $F_L$. In fact, considering for example the functional split option in which both the RLC ("Radio Link Control") layer and the PDCP ("Packet Data Convergence Protocol") layer (above the RLC layer) are at the remote unit $RU_j$ side, when the scheduler in the MAC layer requests to the upper layers to send a certain amount of data, the RLC layer remove from its buffers (referred to as RLC buffers) the requested amount of data; however, due to the absence of buffers in the PDCP layer for the data received from the upper layers (placed at the central unit CU side), the central unit CU sends data towards the remote unit $RU_j$ over the fronthaul link $F_L$ without any kind of knowledge regarding the current capability of the remote unit $RU_j$ to correctly forward the data traffic intended for each user equipment $UE_i$ attached to it: this might cause congestion issues over the fronthaul link $F_L$ and unavoidable packet loss of user equipment $UE_i$.

Back to the figure, each remote unit $RU_j$ (or at least one remote unit $RU_j$) comprises a plurality of (for example, two or more) remote unit data buffers $105_{i,j}$ each one associated with a respective user equipment $UE_i$ (actually served by that remote unit $RU_j$) for temporarily storing data to be transmitted thereto (i.e., in the example at issue, for temporarily storing the downlink data to be sent to the intended user equipment $UE_i$ at a later time). According to an embodiment of the present invention, the remote unit data buffers $105_{i,j}$ (or at least a subset thereof) comprise the above-mentioned RLC buffers already foreseen in the LTE/LTE-Advanced standard when splitting takes place at RLC layer or above—however, similar considerations apply to MAC layer if splitting takes place below the RLC layer, for example by exploiting MAC buffers already foreseen in the LTE/LTE-Advanced standard. As visible in the figure, the remote unit data buffers associated with the remote unit $RU_1$ are indicated by the references $105_{1,1}$-$105_{5,1}$ (meaning that in the illustrative example all the five user equipment $UE_i$ are assumed to be served by the remote unit $RU_1$), whilst the remote unit data buffers associated with the remote units $RU_2$ and $RU_3$ are indicated by the generic references $105_{i,2}$ and $105_{i,3}$ (meaning that in the illustrative example additional user equipment other than the user equipment $UE_1$-$UE_5$ are assumed to be served by the remote units $RU_2$ and $RU_3$—in any case, nothing prevents that one or more among the user equipment $UE_1$-$UE_5$ and the additional user equipment are served by two or more remote units $RU_j$).

According to the preferred, not limiting, considered embodiment, the central unit CU comprises a plurality of (for example, two or more) central unit data buffers $110_i$ each one associated with a respective user equipment $UE_i$ (actually served a remote unit $RU_j$ associated with that central unit CU) for temporarily storing data (coming from the core network CN) to be transmitted to the remote unit data buffer(s) $105_{i,j}$ associated with that user equipment $UE_i$ (i.e., in the example at issue, for temporarily storing the downlink data to be sent to the intended user equipment $UE_i$ at a later time). As visible in the figure, the central unit data buffers associated with the remote unit $RU_1$ are indicated by the references $110_1$-$110_5$, therefore in the illustrative example all the five user equipment $UE_i$ are assumed to be served by the central unit CU.

FIG. 2 shows, according to an embodiment of the present invention, an activity diagram of a method 200 for arranging data transmission in the mobile network 100, and particularly for determining a data throughput with which the central unit CU can transmit, over the fronthaul link $F_L$, data for a user equipment $UE_i$ to the remote unit data buffer $105_{i,j}$ associated with that user equipment $UE_i$ (downlink transmission). Without losing of generality, the operation steps set out at the nodes of method 200 may be implemented by software (in which case, the resulting method 200 would be performed by proper code means included in a computer program, when the program is run on a computer), hardware, and/or a combination thereof. Moreover, those operation steps pertaining to the central CU and remote $RU_j$ units will be assumed to be performed at respective (pre-existing or dedicated) processing units thereof, not shown; these processing units may have, by the physical viewpoint, distributed nature, it being understood that, by the logical viewpoint, they are all part of that central CU and remote $RU_j$ units, wherever (and in whichever way) their physical implementation actually takes place.

According to the principles of the present invention, the method 200 comprises, in presence of data for a considered or intended user equipment $UE_i$ (hereinafter referred to as user data) at the central unit CU:

determining a status of the remote unit data buffer $105_{i,j}$ associated with the intended user equipment $UE_i$;

determining an average data traffic that the intended user equipment $UE_i$ is able to exchange (particularly, the average data traffic that the intended user equipment $UE_i$ is able to receive, in the exemplary scenario of downlink transmission herein considered);

according to the status of the remote unit data buffer $105_{i,j}$ and to the average data traffic, determining the data throughput with which the central unit CU can transmit the user data to the remote unit data buffer $105_{i,j}$ associated with the intended user equipment $UE_i$, and causing the central unit CU to transmit the user data for the intended user equipment $UE_i$ to the remote unit data buffer $105_{i,j}$ associated with the intended user equipment $UE_i$ according to the determined data throughput.

Preferably, the determining of the status of the remote unit data buffer $105_{i,j}$, the determining of the average data traffic, the determining of the data throughput and the transmission of the user data according to the determined data throughput are carried out if the user data determine a load condition of the central unit data buffer $110_i$ associated with the intended user equipment $UE_i$ below a threshold load condition, the threshold load condition of the central unit data buffer $110_i$ being for example associated with a potential congestion of the central unit data buffer $110_i$ and/or of the backhaul link. Even more preferably, the determining of the status of the remote unit data buffer $105_{i,j}$, the determining of the average data traffic, the determining of the data throughput and the transmission of the user data according to the determined data throughput are carried out upon reception at the core network CN, and hence at the central unit CU, of new data for the intended user equipment $UE_i$ (hereinafter referred to as new user data). This is represented in the figure by nodes 205-220, discussed here below.

Upon availability of new user data at the core network CN (activity node 205), and upon transmission thereof from the core network CN to the central unit CU (action node 210), the central unit CU checks (action node 215) whether the load condition of the central unit data buffer $110_i$ associated with the intended user equipment $UE_i$ is below the threshold load condition—in the considered example of reception of new user data, the load condition of the central unit data buffer $110_i$ being evaluated by considering the contribution of the new user data and, if provided, of data previously stored in the central unit data buffer $110_i$ and still waiting to be transmitted (hereinafter referred to as previous user data).

If the load condition of the central unit data buffer $110_i$ associated with the intended user equipment $UE_i$ is below the threshold load condition (exit branch Y of the decision node 215), the method 200 carries out the steps for determining the data throughput and for causing the central unit CU to transmit the user data stored in the central unit data buffer $110_i$ associated with the intended user equipment $UE_i$ to the remote unit data buffer $105_{i,j}$ associated with the same intended user equipment $UE_i$ (see nodes 225-250, discussed in the following).

If the load condition of the central unit data buffer $110_i$ associated with the intended user equipment $UE_i$ is above (or at least equal to) the threshold load condition (exit branch N of the decision node 215), meaning that a potential congestion of the central unit data buffer $110_i$ and/or of the backhaul link could arise with the current load condition of the central unit data buffer $110_i$, then transmission of the previous user data already stored in the central unit data buffer $110_i$ is waited (and, preferably, no storing of the new user data into the central unit data buffer $110_i$ takes place before the previous user data have been at least partially transmitted). This is represented in the figure by loop connection between the exit branch N of the decision node 215 and the input of the same decision node 215.

Preferably, as illustrated, the transmission of the previous user data already stored in the central unit data buffer $110_i$ is waited for a predetermined waiting period $\Delta t$, the predetermined waiting period $\Delta t$ for example starting upon ascertaining that the load condition of the central unit data buffer $110_i$ associated with the intended user equipment $UE_i$ is above (or at least equal to) the threshold load condition. This is represented, in the figure, by interposition of a decision node 220 between the exit branch N of the decision node 215 and the input of the same decision node 215, at the decision node 220 the central unit CU checking whether the predetermined waiting period $\Delta t$ has elapsed: if the predetermined waiting period $\Delta t$ has not elapsed yet (exit branch N of the decision node 220), the central unit CU checks again (action node 215) whether the load condition of the central unit data buffer $110_i$ associated with the intended user equipment $UE_i$ is below the threshold load condition (as discussed above)—the load condition supposedly lowering at each iteration by virtue of the transmission of the previous user data meanwhile occurring between the central unit data buffer $110_i$ and the remote unit data buffer(s) $105_{i,j}$ associated with the intended user equipment $UE_i$.

As visible in the figure, if (exit branch Y of the decision node 220) the predetermined waiting period $\Delta t$ has elapsed but the load condition of the central unit data buffer $110_i$ associated with the intended user equipment $UE_i$ is still above the threshold load condition (or, in alternative embodiments of the present invention, the central unit data buffer $110_i$ is not empty), e.g. due to unexpected congestion in the mobile network 100, then the method 200 carries out the steps for determining the data throughput and for causing the central unit CU to transmit the (previous) user data stored in the central unit data buffer $110_i$ associated with the intended user equipment $UE_i$ to the remote unit data buffer $105_{i,j}$ associated with the same intended user equipment $UE_i$ (see nodes 225-250, discussed in the following). In this case, therefore, the data throughput determined in the following nodes 225-250 is primarily aimed at solving the congestion affecting the previous user data.

According to an embodiment of the present invention, no storing of the new user data into the central unit data buffer $110_i$ takes place before the previous user data have been completely transmitted (central unit data buffer $110_i$ empty). According to an alternative embodiment of the present invention, the new user data are progressively stored in the central unit data buffer $110_i$ as the previous user data are transmitted—preferably, the progressively storing of new user data in the central unit data buffer $110_i$ still taking place while ensuring that the load condition of the central unit data buffer $110_i$ does not exceed the threshold load condition.

Back to the activity diagram, at nodes 225-250 the method 200 carries out the steps for determining the data throughput and for causing the central unit CU to transmit, according to the determined data throughput, the (previous and/or new) user data stored in the central unit data buffer $110_i$ associated with the intended user equipment $UE_i$ to the remote unit data buffer $105_{i,j}$ associated with the same intended user equipment $UE_i$.

As mentioned above, the data throughput with which the central unit CU can transmit the user data to the remote unit data buffer $105_{i,j}$ associated with the intended user equipment $UE_i$ is determined according to the status of the remote unit data buffer $105_{i,j}$ (which is determined/available at the remote unit $RU_j$) and to the average data traffic that the intended user equipment $UE_i$ is able to exchange.

According to two alternative embodiments of the present invention, based on actual computation capabilities of the central CU and remote $RU_j$ units, the average data traffic that the intended user equipment $UE_i$ is able to exchange (and, hence, the data throughput derived from status of the remote unit data buffer $105_{i,j}$ and from the average data traffic) may be determined either at the remote unit $RU_j$ side (as exemplarily assumed from now on) or at the central unit CU side.

According to an embodiment of the present invention, the average data traffic that the intended user equipment $UE_i$ is able to exchange is determined, at the remote unit $RU_j$, based on a spectral efficiency associated with the intended user equipment $UE_i$ (i.e. the information rate, e.g. in terms of Mbps, that can be transmitted over a given bandwidth from the remote unit data buffer $105_{i,j}$ to the intended user equipment $UE_i$).

Back to the activity diagram, the central unit CU requests (action node 225) the status of the remote unit data buffer $105_{i,j}$, and the spectral efficiency associated with the intended user equipment $UE_i$.

According to an embodiment of the present invention, the spectral efficiency associated with the intended user equipment $UE_i$ is determined (action node 235) based on the CQI ("Channel Quality Indicator") indicator if the remote unit data buffer $105_{i,j}$ associated with the intended user equipment $UE_i$ is empty (exit branch Y of decision node 230). In fact, in case that the remote unit data buffer $105_{i,j}$ associated with the intended user equipment $UE_i$ is empty, no transmission between the remote unit $RU_j$ and the intended user equipment $UE_i$ is taking place, so that the CQI indicator may be regarded as a reliable clue about the radio conditions experienced by the user equipment $UE_i$ and hence about the amount data traffic that, on average, the intended user equipment $UE_i$ is able to receive.

According to an embodiment of the present invention, the spectral efficiency associated with the intended user equipment $UE_i$ is determined (action node 240) based on at least one transmission parameter related to a current transmission taking place between the intended user equipment $UE_i$ and the remote unit $RU_j$ if the remote unit data buffer $105_{i,j}$ associated with the intended user equipment $UE_i$ is not empty (exit branch N of decision node 240). In fact, in case that the remote unit data buffer $105_{i,j}$ associated with the intended user equipment $UE_i$ is not empty, transmission between the remote unit $RU_j$ and the intended user equipment $UE_i$ is taking place, so that the transmission parameter(s) may be regarded as the most reliable clue about the amount data traffic that, on average, the intended user equipment $UE_i$ is able to receive. Preferably, the transmission parameter(s) comprise at least one among:

"Modulation and Coding Scheme" (MCS), for example, based on the MCS index value list provided by LTE/LTE-A standard and giving every possible combination of number of spatial streams, modulation type, coding rate;

a rank indicator indicating the number of layers and the number of different signal streams transmitted in the downlink (for example, the "Rank Indicator" provided by LTE/LTE-A standard);

a signal-to-interference-plus-noise ratio, i.e. the power of a signal of interest divided by the sum of the interference power (from all the other interfering signals) and the power of a background noise;

CQI indicator.

Upon determining the spectral efficiency associated with the intended user equipment $UE_i$ (node 235 or node 240), the remote unit $RU_j$ preferably transmits to the central unit CU information about the spectral efficiency (hereinafter, spectral efficiency information) and information about the status of the remote unit data buffer $105_{i,j}$ (hereinafter, buffer status information), thereafter, according to the spectral efficiency and buffer status information (and, preferably, according also to information related to the other user equipment $UE_i$ associated with the same central unit CU and needing data), the central unit CU determines (action node 245) the data throughput with which the central unit CU can transmit (over the fronthaul link $F_L$) the (previous and/or new) user data to the remote unit data buffer $105_{i,j}$ associated with the intended user equipment $UE_i$. Preferably, the spectral efficiency information comprises an index from a table containing quantized values of spectral efficiency, and the buffer status information comprises an index from a table containing quantized values of the status of the remote unit data buffer $105_{i,j}$.

According to an alternative embodiment of the present invention, and depending for example on the computation capabilities of the central CU and remote $RU_j$ units, upon determining the spectral efficiency associated with the intended user equipment $UE_i$ (node 235 or node 240) the remote unit $RU_j$ may determine on its own the data throughput (in which case, transmission to the central unit CU of the spectral efficiency and buffer status information may be avoided, with the remote unit $RU_j$ that may instead be configured to transmit to the central unit CU only the information about the determined data throughput).

As mentioned above, based on actual computation capabilities of the central CU and remote $RU_j$ units, the average data traffic that the intended user equipment $UE_i$ is able to exchange (and, hence, the data throughput derived from status of the remote unit data buffer $105_{i,j}$, and from the average data traffic) may be determined at the central unit CU side. In this case, the average data traffic that the intended user equipment $UE_i$ is able to exchange may for example be determined, at the central unit CU, based on at least one among the above mentioned transmission parameters. Therefore, upon transmission to the central unit CU of the transmission parameter(s), together with the buffer status information, the central unit CU determines the average data traffic that the intended user equipment $UE_i$ is able to receive, and hence the data throughput with which the central unit CU can transmit (over the fronthaul link $F_L$) the (previous and/or new) user data to the remote unit data buffer $105_{i,j}$ associated with the intended user equipment $UE_i$.

In any case, according to alternative embodiments of the present invention, and depending for example on the computation capabilities of the central CU and remote $RU_j$ units, the remote unit $RU_j$ may determine on its own the average data traffic based on the transmission parameter(s) (in which case, transmission to the central unit CU of the transmission parameter(s) may be avoided, with the remote unit $RU_j$ that may instead be configured to transmit to the central unit CU only the information about the determined data throughput).

Preferably, the information exchanged between the remote unit $RU_j$ and the central unit CU for determining the average data traffic (namely, the spectral efficiency information, the buffer status information, the transmission parameter(s)), is exchanged or reported periodically (e.g., during a current data transmission from the central unit CU to the remote unit $RU_j$)—hereinafter, periodic report mode.

Additionally or alternatively, this information can be exchanged or reported aperiodically (hereinafter, aperiodic report mode). According to an embodiment of the present invention, aperiodic report mode takes place according to a request by the central unit CU (e.g., when new user data are available at the core network CN for the intended user equipment $UE_i$ and the respective central unit data buffer $110_i$ is empty). According to another embodiment of the present invention, aperiodic report mode takes place on remote unit $RU_j$ initiative (for example, when a load condition of the remote unit data buffer $105_{i,j}$ associated with the intended user equipment $UE_i$ reaches a predetermined, e.g. high or low, load condition).

Therefore, according to the present invention, in order to not exceed the data throughput allowed by the remote unit $RU_j$ radio interface (which usually has the most limiting effect as compared to the maximum allowable data throughput of the fronthaul link $F_L$), the central unit CU is configured to assess, on a per-user equipment $UE_i$ basis, both the data throughput with which the central unit CU can transmit the (previous and/or new) user data for the intended user equipment $UE_i$ to the remote unit $RU_j$ and the amount of data to be stored locally into its own central unit data buffer $110_i$ associated with that intended user equipment $UE_i$. This allows avoiding, or at least reducing to a considerable extent, congestion in the mobile network 100.

Naturally, in order to satisfy local and specific requirements, a person skilled in the art may apply to the present invention many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the present invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the present invention may be incorporated in any other embodiment as a matter of general design choice.

More specifically, the present invention lends itself to be implemented through an equivalent method (by using similar steps, removing some steps being not essential, or adding further optional steps); moreover, the steps may be performed in different order, concurrently or in an interleaved way (at least partly).

Moreover, although explicit reference has been made to a mobile network based on the LTE/LTE-A standard, it should be understood that it is not in the intentions of the Applicant to be limited to the implementation of any particular mobile network architecture or protocol.

Furthermore, the present invention may be applied to substantially all functional split options provided by LTE/LTE-A system which assign to the remote units at least the functionalities that pertains to the MAC layer (e.g., resource scheduling).

Finally, as should be apparent from the previous discussion, the present invention may be beneficial in solving congestion issues deriving from both unacknowledged data traffic, such as UDP ("User Datagram Protocol") data traffic, and acknowledged traffic, such as TCP ("Transmission Control Protocol") data traffic.

The invention claimed is:

1. A method for arranging data transmission in a mobile network, the mobile network comprising a base station having a central unit and a remote unit, wherein the remote unit comprises a plurality of remote unit data buffers each one associated with a respective user equipment for temporarily storing data to be transmitted thereto, for each selected user equipment the method comprising, in presence of data for the selected user equipment at the central unit:

determining a status of the remote unit data buffer associated with the selected user equipment;
determining an average data traffic that the selected user equipment is able to receive;
according to said status of the remote unit data buffer and to said average data traffic, determining a data throughput with which the central unit can transmit said data for the selected user equipment to the remote unit data buffer associated with the selected user equipment, and
causing the central unit to transmit said data for the selected user equipment to the remote unit data buffer associated with the selected user equipment according to the determined data throughput.

2. The method according to claim 1, wherein the central unit comprises a plurality of central unit data buffers each one associated with a respective user equipment for temporarily storing data to be transmitted to the remote unit data buffer associated with that user equipment, said determining a status said determining an average data traffic, said determining a data throughput and said causing the central unit to transmit being carried out if said data for the selected user equipment determine a load condition of the central unit data buffer associated with the selected user equipment below a threshold load condition.

3. The method according to claim 2, wherein said determining a status, said determining an average data traffic, said determining a data throughput and said causing the central unit to transmit are carried out upon reception at the central unit of said data for the selected user equipment.

4. The method according to claim 1, wherein said determining an average data traffic that the selected user equipment is able to receive comprises determining, at the remote unit, a spectral efficiency associated with the selected user equipment.

5. The method according to claim 4, wherein said determining a spectral efficiency associated with the selected user equipment comprises determining the spectral efficiency associated with the selected user equipment based on a channel quality indicator if the remote unit data buffer associated with the selected user equipment is empty.

6. The method according to claim 4, wherein said determining a spectral efficiency associated with the selected user equipment comprises determining the spectral efficiency associated with the selected user equipment based on at least one transmission parameter related to a current transmission between the selected user equipment and the remote unit ER if the remote unit data buffer associated with the selected user equipment is not empty.

7. The method according to claim 6, wherein least one transmission parameter comprises at least one among:
modulation and coding scheme;
rank indicator,
signal to noise ratio;
channel quality indicator.

8. The method according to claim 1, wherein said determining an average data traffic that the selected user equipment is able to receive comprises determining, at the central unit, the average data traffic according to at least one among:
modulation and coding scheme;
rank indicator;
signal to noise ratio;
channel quality indicator.

9. The method according to claim 1, wherein said determining an average data traffic that the selected user equipment is able to receive is based on at least one information exchanged between the remote unit and the central unit.

10. The method according to claim 9, wherein said at least one information exchanged between the remote unit and the central unit is exchanged periodically.

11. The method according to claim 9, wherein said at least one information exchanged between the remote unit and the central unit is exchanged aperiodically.

12. The method according to claim 11, wherein said at least one information exchanged between the remote unit and the central unit is transmitted by the remote unit to the central unit on central unit request upon reception at the central unit of said data for the selected user equipment and/or on remote unit initiative when a load condition of the remote unit data buffer associated with the selected user equipment reaches a predetermined load condition.

13. The method according to claim 1, wherein radio functionalities are split between the central unit and the remote unit according to a functional split option in which, for downlink transmission, radio resource scheduling is performed at the remote unit side and corresponding scheduling decisions are not communicated to the central unit.

14. The method according to claim 13, in which media access control layer is implemented at the remote unit side.

15. A base station having a central unit and a remote unit, wherein the remote unit comprises a plurality of remote unit data buffers each one associated with a respective user equipment for temporarily storing data to be transmitted thereto, for each selected user equipment the base station being configured to, in presence of data for the selected user equipment at the central unit:
  determine a status of the remote unit data buffer associated with the selected user equipment;
  determine an average data traffic that the selected user equipment is able to receive;
  according to said status of the remote unit data buffer and to said average data traffic, determine a data throughput with which the central unit can transmit said data for the selected user equipment to the remote unit data buffer associated with the selected user equipment, wherein the central unit is configured to transmit said data for the selected user equipment to the remote unit data buffer associated with the selected user equipment according to the determined data throughput.

\* \* \* \* \*